United States Patent [19]

Wilcock et al.

[11] Patent Number: 4,849,098
[45] Date of Patent: Jul. 18, 1989

[54] CONTINUOUS WATER QUALITY MONITOR

[76] Inventors: Anthony Wilcock, 76 E. Palm, Burbank, Calif. 91502; Karol Renau, 8465 Canoga Ave., Canoga Park, Calif. 91304

[21] Appl. No.: 178,457

[22] Filed: Apr. 7, 1988

[51] Int. Cl.⁴ .................. B01D 13/00; G08B 21/00
[52] U.S. Cl. .................... 210/85; 73/61 R; 210/96.2; 210/257.2; 324/442
[58] Field of Search ............. 73/61 R; 210/85, 96.1, 210/96.2, 257.2; 324/442, 443, 446, 449

[56] References Cited

U.S. PATENT DOCUMENTS

| | | | |
|---|---|---|---|
| 3,410,292 | 11/1968 | Bennett et al. | 210/96.2 X |
| 3,838,774 | 10/1974 | Dolan et al. | 210/85 |
| 3,879,657 | 4/1975 | Nystuen et al. | 324/443 |
| 3,953,790 | 4/1976 | Ebling et al. | 324/446 |
| 3,990,066 | 11/1976 | Malmgren | 210/85 X |
| 4,383,221 | 5/1983 | Morey et al. | 324/442 X |
| 4,587,518 | 5/1986 | King | 210/85 X |
| 4,623,451 | 11/1986 | Oliver | 210/87 |
| 4,708,791 | 11/1987 | Dillard, III | 210/96.2 |
| 4,744,895 | 5/1988 | Gales et al. | 210/96.2 |

Primary Examiner—Robert H. Spitzer
Attorney, Agent, or Firm—John E. Wagner

[57] ABSTRACT

An automatic monitor for potable water quality which monitors total dissolved solids (TDS) in drinking water. Built into a faucet base are a pair of indicators in the form of one green and one red LED. A sensor in the form of a pair of spaced electrodes extends into the supply conduit for the faucet and measures the electrical resistances of the water in the conduit. A pulse power source powered by a battery supplies power to automatically periodically power the sensor and illuminate the green LED as long as the TDS level is below a preselected value. If the level exceeds the preselected value, the red LED is periodically illuminated. The duty cycle for operation and illuminating the LEDs is approximately 0.5% whereby battery drain is sufficiently low that months of continuous monitoring is possible using 4 AA batteries. No ON-OFF switch is needed. If neither LED illuminates once every two minutes, the batteries need replacement.

8 Claims, 3 Drawing Sheets

U.S. Patent  Jul. 18, 1989  Sheet 1 of 3  4,849,098
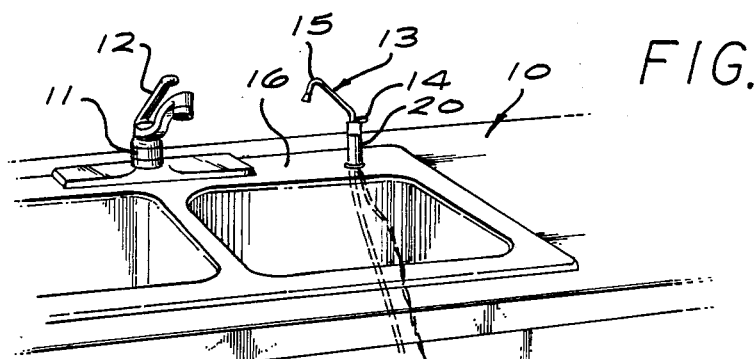
FIG. 1
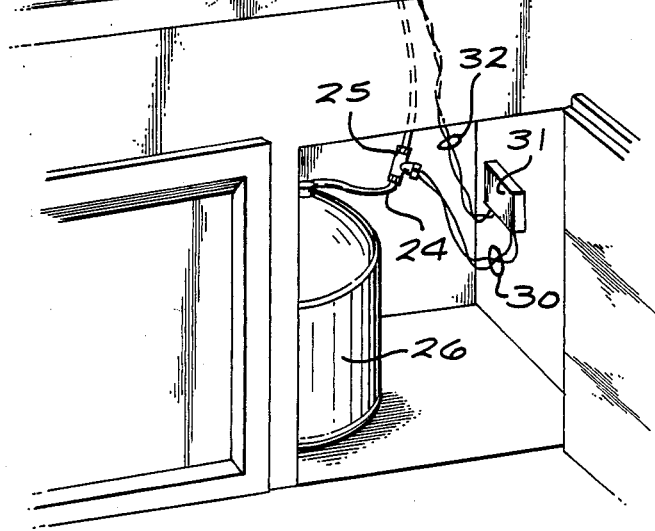
FIG. 2
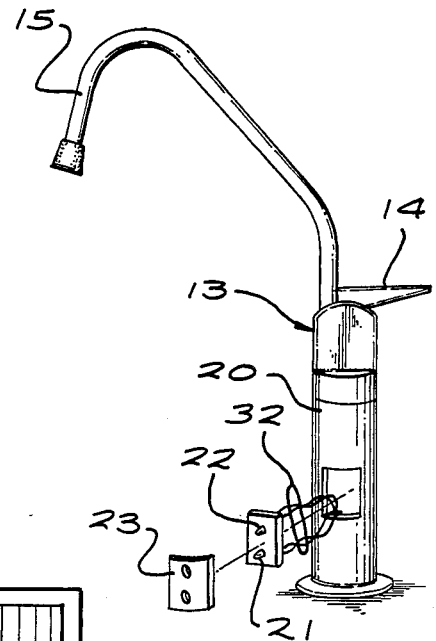
FIG. 3
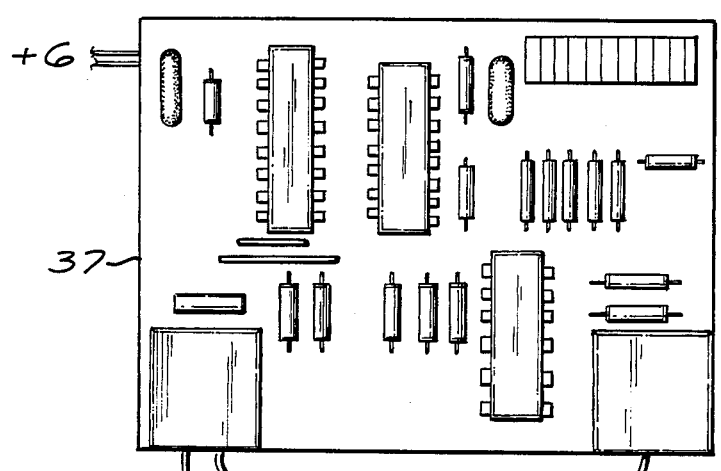
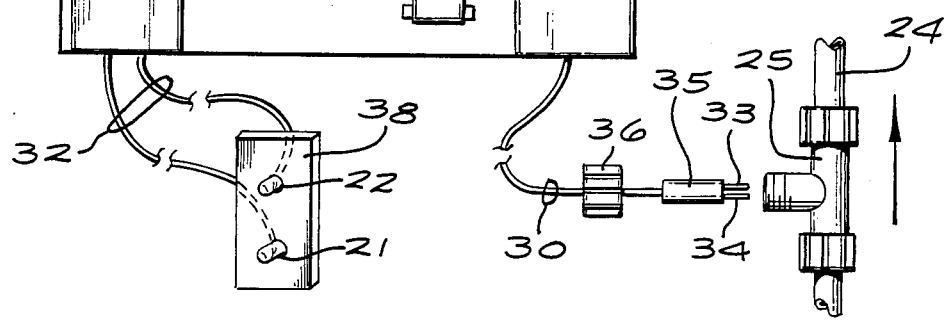

CONTINUOUS WATER QUALITY MONITOR

BACKGROUND OF THE INVENTION

In recent years, much attention has been directed toward the improvement and maintenance of the quality of potable water. The inroads of ground water contamination, depletion of normal ground water supplies and the influx of less desirable water including dissolved solids has presented a problem to water users. Municipal and central water suppliers have taken major steps forward in the insurance of safer water supplies. However, the level of dissolved mineral solids in potable water often does not meet the standards expected by the home user. This has resulted in the installation of thousands of home water purification systems. These systems consist principally of reverse osmosis systems or activated carbon filters. Strictly speaking, carbon filters do not purify the water but remove odor and taste carrying impurities but not bacteria or dissolved solids.

Where the source of potable water is brackish water, purifying systems such as reverse osmosis systems are used. They employ semipermeable membranes in which a partial pressure is maintained across a membrane which exhibits preferential migration of water relatively free from dissolved solids over water containing concentrations of such solids. Potable water from brackish water may thus be obtained. In any such system or any filter which does remove impurities has a limited life or may become inoperative if the membrane becomes punctured. In such case, the total dissolved solids (TDS) will increase to an unacceptable level and often go unnoticed by the user who becomes acclimated to a gradual increase in mineral content.

A solution is to the measurement of the TDS or to give warning of the change of operation or more correctly faulty or non-operation of a filter system by the use of a monitoring system. Such monitors often employ a pair of probes which are used to sense any change in electrical conductivity of the filtered water. The conductivity of the water increases with increase in total dissolved solids. Laboratories often have elaborate monitoring systems. For the home filter user, however, such elaborate monitoring systems are prohibitively expensive and complicated to operate so are totally impractical for their use. Other monitoring systems are simplified to the extent that they are battery powered and built into a faucet and as such, any indicator of any unsafe or unsatisfactory filter operation may be easily observed by the user.

In one such monitor, the faucet handle operates an electrical switch to enable a battery powered electrical circuit for measuring the total dissolved solids (TDS) and for indicating by a lamp, for example a red LED, that unsatisfactory filtering is occurring. Such a system is disclosed in U.S. Pat. No. 4,623,451 to Oliver. The use of a faucet lever controlled monitoring circuit conserves energy of the battery since none of the monitoring system is active except during the flow of water. Any instabilities in the measurement process due to flow is accentuated in such a system since measurements are made only during flow. It has been suggested that significant measurement errors exist in measurements made during flow as compared with the correct measurement made under static conditions.

Although this has not been personally verified by ourselves, we are aware of a more significant user perception limitation in the lever operated monitoring systems. That is, the measurement occurs only after flow has begun. It can be disconcerting to the user to learn as his glass fills that the water is not of acceptable quality. Although the water is probably not harmful, except for those sensitive to excess mineral content of water, the user is dismayed and finds himself in a position with a partly filled glass and unsure of the water supply quality. Moreover, the casual user is probably unable to recognize the nature of the problem and to know the solution, i.e. call for a water technician or if the system may be maintained by the home owner, replace the filter.

One other approach to home filteration systems with TDS monitoring is illustrated in U.S. Pat. No. 4,708,791 to J. A. R. Dillard, III, issued Nov. 24, 1987.

In the Dillard patent a pair of probes are introduced into the supply line to a faucet and connected to an electronic circuit which measures the TDS content of the water in the delivery line whenever the circuit is energized. A manual switch is located at some accessible location and one may test the TDS content of the water whether there is flow in the system or not. This system, of course, conserves battery energy but requires one to intentionally test the system.

Even though these two monitoring systems have made steps forward in trouble free monitoring of potable water quality, still lacking is a truly automatic quality monitoring system which is battery operated and continually indicates the water quality prior to any water being drawn and requiring no action on the part of the user, preferably without the need for the user to operate any switch whatsoever to verify the water condition.

BRIEF DESCRIPTION OF THE INVENTION

Faced with this state of the art, we sought and have achieved a truly fully automatic water quality monitoring system which is easily installed between a filter and the faucet of a potable water home delivery system. The faucet includes in its base a pair of light emitting diodes (LEDs) of different color, preferably one red and one green. The green LED is normally illuminated to indicate that the water exposed to probe electrodes in the water delivery system sense an electrical conductivity of such low level as to indicate acceptable water is in the system. The level of total dissolved solids (TDS) indicated may be selected by the water technician who installs the filtration system to match the appropriate TDS level for the user.

We employ a battery powered circuit similar to the prior art systems, however, have designed a novel monitoring system which allows continuous monitoring of water condition while maintaining a battery life of at least several months, a period which is greater than the active life of a typical domestic filter of the activated carbon type. Therefore, employing our invention, with each change of filter, a new set of batteries should be installed. If the water TDS level is below the selected level, the green LED becomes illuminated periodically, e.g. once every two seconds, until the TDS level rises to an unacceptable level, e.g. the filter becomes exhausted or the supply level rises and the filter is incapable of lowering the TDS level to the selected value. The red LED will become periodically illuminated and the green LED extinguished. With the LEDs located in the base of the faucet facing the user, the change in water condition is immediately apparent and corrective measures taken by contacting the water technician who may change the filter or make other required change.

This continuous monitoring and periodic display by a battery powered system is possible employing four 1.5 volt type AA batteries in series to provide a nominal 6.0 volt d.c. source. A first voltage divider includes a probe assembly with the resistance of the water in contact with a pair of stainless steel probes constituting a variable resistance. A reference resistance network provides a common voltage drop for the probe water variable resistance and for a second variable resistance. The second variable resistance comprises a plurality of selected resistances arranged to be substituted in place by any one of a number of electrical jumpers. A pair of voltage comparators each have one input from respective probes and a second input. The first of the two voltage comparators has its second input from the jumper selected resistance network. The second voltage comparator has its second input from a pulse power source having a duty cycle in the order of 0.5%. The output of the second voltage comparator is a gate which through an amplifier powers a green LED. A second gate is coupled to the output of the first voltage comparator to be enabled by coincidence between an output pulse from the first voltage comparator and the pulse source. This occurs whenever the resistance between the probes exceeds the resistance selected in the second resistance network, i.e. the TDS of the water is above the selected level. Enabling of the first gate applies a periodic exciting voltage to the red LED and provides a disabling input to the green LED voltage comparator, turning off the green LED. Power is consumed by the display only when the pulse source conducts thereby minimizing the current drain of the monitor.

The monitor system requires no switches, only the one time resistance jumper installation. The physical assembly of the electrical circuitry is out of view below a counter and only the faucet with its build-in LEDs is visible to the user. No user action is required for operation.

BRIEF DESCRIPTION OF THE DRAWING

This invention may be more clearly understood from the following detailed description and by reference to the drawings in which:

FIG. 1 is a perspective view of a typical residential installation with the sink cabinet door open and with portions of the installation shown in dashed lines;

FIG. 2 is a perspective view, partly exploded, of the faucet of FIG. 1;

FIG. 3 is a front elevational view of the electronic circuit board of this invention;

DETAILED DESCRIPTION OF THE INVENTION

Figure 4:
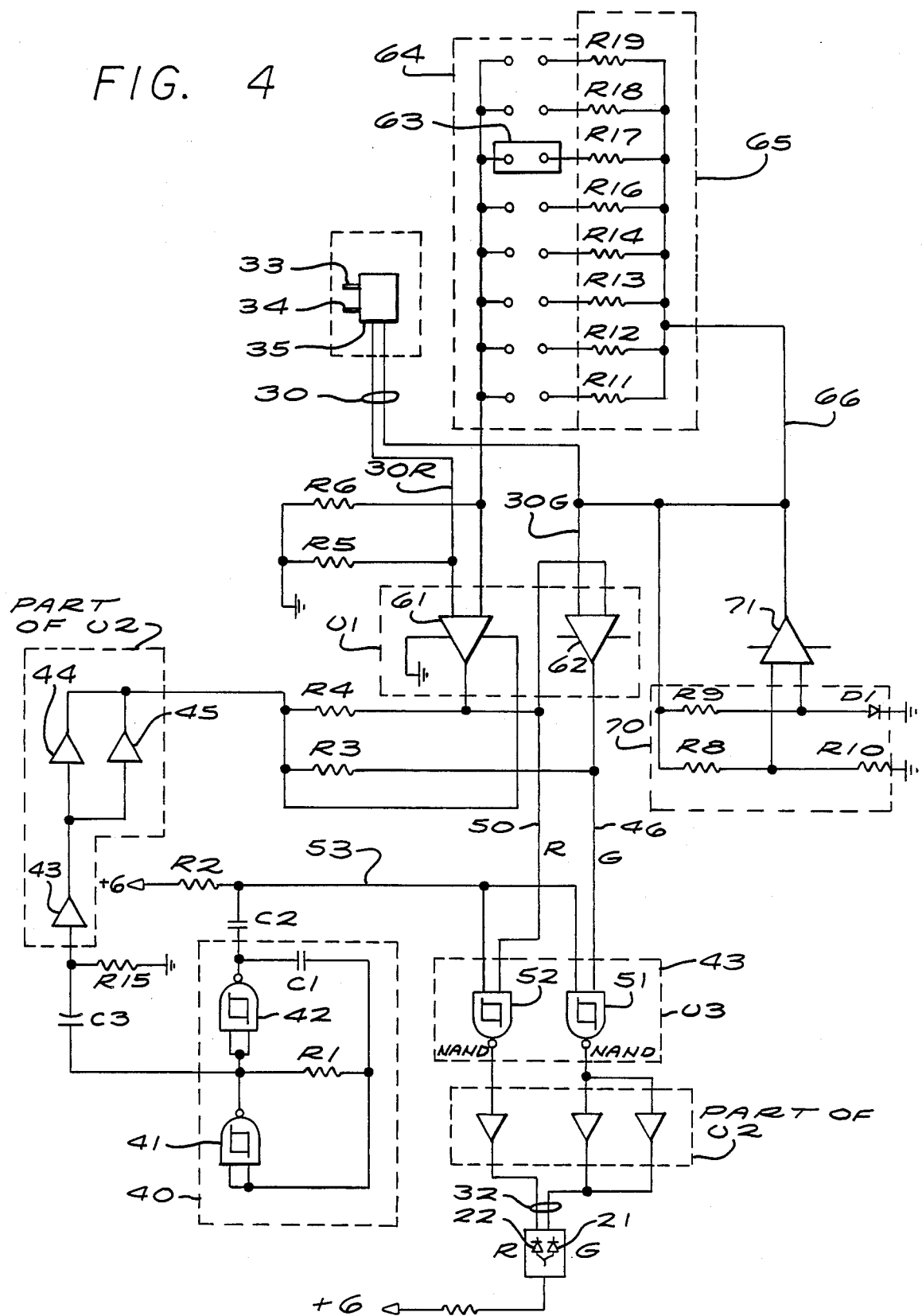
FIG. 4 is an electrical schematic drawing of this invention.
Figure 5:
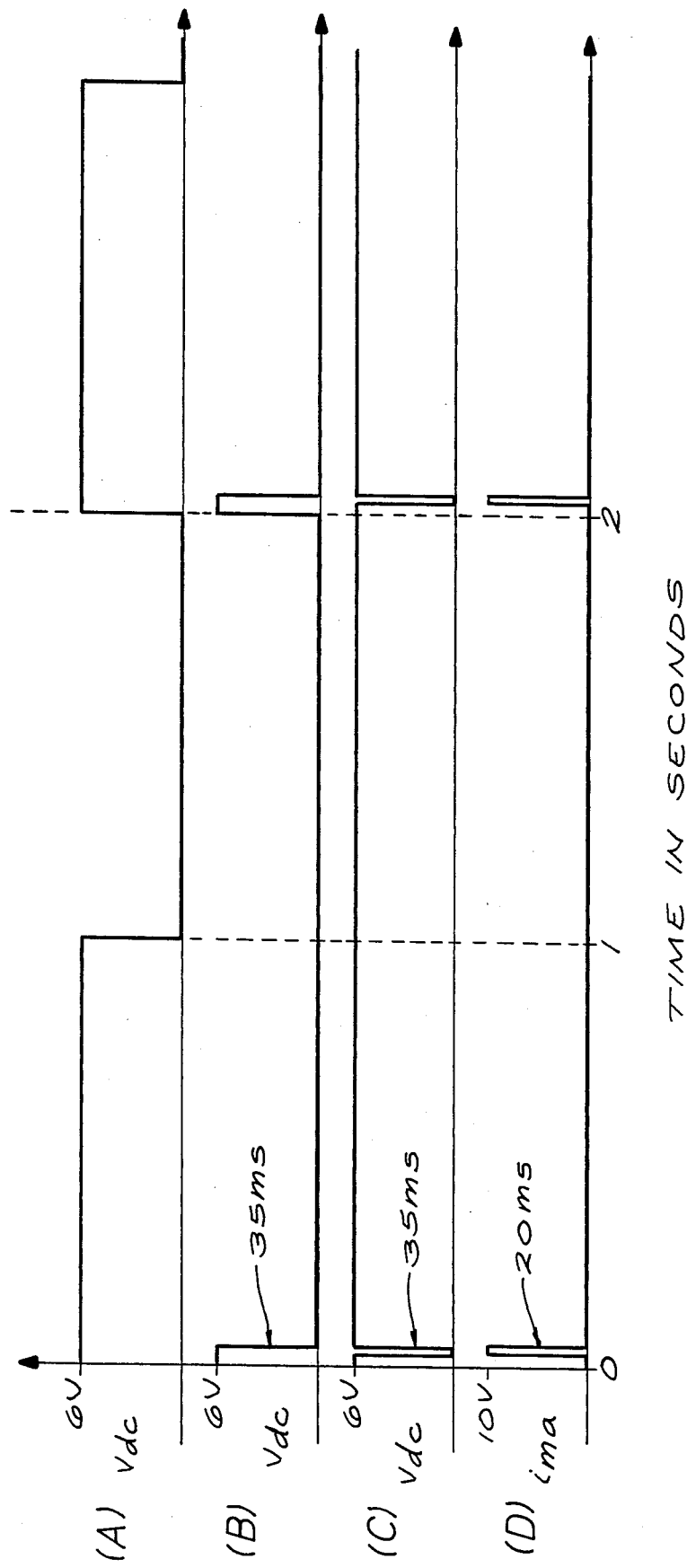
FIG. 5 is a graphical representation of the significant waveforms of this invention.

Now referring to FIG. 1, a typical household sink installation generally designated 10 is shown including a standard mixing faucet 11 with its operating handle 12 and an auxiliary potable water delivery or glass filling faucet 13 including an operator handle 14 and a spout 15. The faucet 13 is located on the top surface of the sink 16 and includes an upstanding base 20 which is slightly taller than conventional bases for glass filling faucets of this type. Notable in the base are a pair of indicator lamps 21 and 22 that are seen in FIG. 2. As may be seen in FIG. 2, the base includes an opening and a coverplate 23 through which the indicator lamps extend in full view of the faucet user.

Referring again to FIG. 1, the faucet 13 is served by a supply line 24 part of which is concealed beneath the sink as shown in dashed lines and the part appearing through the open door of the sink cabinet 10, shown in solid lines. The line 24 includes a T intersection 25 and is served by filter or reverse osmosis system 26. The T intersection 25 has a pair of electrical leads 30 extending from internal probes as seen in FIG. 3 to a circuit box 31 which contains the electronic circuitry of this invention and battery supply. Extending out of box 31 is a second pair of leads 32 which extend into the base 20 and communicate with the indicators 21 and 22, which in preferred embodiment are a red and a green LED respectively. Actually leads 32 are two pair of leads, one pair for the red LED 21 and the second pair for the green LED 22.

The faucet 13 to the user is virtually unchanged from those faucets lacking the base 20 from the user's standpoint. Pressing the lever 14 causes potable water to flow from the spout 15 as long as the lever 14 is depressed. A continuous flow may be produced by pivoting the lever 14 to an upright position where it is held by generally flat inner end of lever 14 until released and overcome by an internal spring, unshown in the drawing.

The electronic elements of this invention may be seen in FIG. 3 as described above. The input to the circuit is in the form of a sensor having a pair of probes 33 and 34 molded into a plug 35 which is secured in T fitting 25 by end cap 36. The probe elements 33 and 34 extend into the water path through line 24 from its source, e.g. filter 26 to the faucet 13. Leads 30 are of known resistance and the electrical resistance of the water flowing through the pipe 24 or standing in the pipe when the faucet is not in use provides a variable resistance element which is measured by the electronic circuitry located on printed circuit board 37, the elements of which are described below in connection with FIG. 4. The LEDs 21 and 22 are shown in FIG. 3 physically mounted on an insulated support board 38 and connected to the circuitry on printed circuit board 37 via leads 32.

Now referring to FIG. 4, the electrical schematic of the preferred embodiment of this invention is shown therein. The circuit of FIG. 4 is powered by four 1½ volt AA batteries or the equivalent providing a six volt potential. The battery potential is applied between the two terminals labeled +6 in the drawing, one adjacent to resistor R2 and the second through a resistor to a pair of diodes (LED, LEDs 21 and 22) identified as R and G to each of the ground terminals identified in FIG. 4. The battery provides all power for sensing, signal processing and displaying employing LED indicators 21 and 22.

Note that the circuit does not include an ON/OFF switch since none is required employing the novel combination of this invention. The sensing circuit is continuously active however it draws very little current and the display circuit is only active approximately one-half of one percent of the time. Therefore, this system affords a life of the batteries equivalent or greater than the normal active life of the filter before replacement or servicing. The heart of the invention involves an oscillator 40 employing a pair of Schmitt trigger circuits 41 and 42 powered by the battery and with the RC network make up of C1 and R1 provide a 10 to 12 millisecond output pulse every two seconds.

The amplified wave pattern appears at the output of the pulse power supply, oscillator 40 and pulse amplifier included in integrated circuit U2, including amplifier stages 43, 44 and 45 which is coupled by pull-up resistors R3 and R4 to a pair of leads 46 and 50 which constitute triggering inputs to the green and red LEDs 21 and 22 respectively. The leads 26 and 50 constitute one input to the pair of NAND gates found in integrated circuit U3. The second input to NAND gates 51 and 52 are over lead 53 from the battery supply by resistor R2. Positive potential is applied to the second input terminal of each of the NAND gates 51 and 52 at all times.

Whenever a triggering signal appears on either lead 46 or 50 to the respective NAND gate 51 or 52, an output pulse from the buffer amplifiers, also a part of integrated circuit U2 is applied to the respective green LED 21 or red LED 22. Normally the green LED 21 flashes once per every two seconds indicating that the water filter system is operative.

The determination of whether the green LED 21 or the red LED 22 is illuminated depends upon the condition of the lines 46 and 50 which are connected to the output of a pair of a dual differential amplifier assembly designated 60 having a first differential amplifier 61 associated with the red LED 22 and a second differential amplifier 62 which drives the green LED 21. The differential amplifier assembly 61 is part of integrated circuit U1 of FIG. 3. If neither LED is illuminated, the battery requires replacement.

The probes 33 and 34 constituting a part of the probe assembly 35 are connected by feeds 30 as one input to each of the differential amplifiers 61 and 62. The resistance of the probe assembly 35 is at variable value depending upon the electrical resistance of the fluid in which probes 33 and 34 are immersed namely water in the line 24 of FIGS. 1 and 3. The input of differential amplifier 61 is stabilized with respect to ground via resistors R5 and R6. A selectable standard voltage between the second input of differential amplifiers 61 and the first input of differential input 62 is a resistance network made up of resistor elements R11 through R14 or R16 through R19 with a movable jumper 63 forming a part of a jumper plug assembly 64. The jumper 63 is moved by the installer to the level for normal, acceptable water quality with the probes 33 and 34 exposed to freshly filtered water in line 24. Thereafter, any change in the total dissolved solids (TDS) in line 24 of FIGS. 1 and 3 will energize the green LED and cause the red LED 22 to be illuminated. This is accomplished by reason of the resistance network 65 being connected via lead 66 and lead 30G to the input of differential amplifier 62. The first input to differential amplifier 62 is stabilized by reference voltage network 70 comprising resistances R8, R9 and R10 and diode D1 connected to ground and differential amplifier 71. The second input to differential amplifier 62 is provided from the output of differential amplifier 61.

NORMAL OPERATION

In normal operation with the probes 33 and 34 lying in the tube 24, power is applied to the circuitry from the battery power source and the oscillator 40 is running at its preselected rate. The resistivity of the fluid between probes 33 and 34 is less than the resistance element, for example R17, across which the jumper shown in FIG. 4 has been placed.

We have found that the following components are effective in a total dissolved solids (TDS) continuous monitor capable of responding to TDS levels of 50 parts per million (PPM) to 500 PPM depending upon the selection of resistance of the jumper 63 with respect to resistance R11 through R19 when the following components are used:

List

| Batteries: 4, 1.5 v Type AA, alkaline cells | | |
|---|---|---|
| Probes: Type 304 stainless steel | | |
| Exposed 0.035" diameter; 0.300" length; 0.180" on center | | |
| U1 | Type LM 324 | |
| U2 | Type CD 4053 | |
| U3 | Type CD 4093 | |
| All resistances are in ohms. | | |
| R1 | 1 M | 1.0% |
| R2 | 274K | 1.0% |
| R3 | 100K | 1.0% |
| R4 | 100K | 1.0% |
| R5 | 1K | 1.0% |
| R6 | 1K | 1.0% |
| R7 | 392 | 1.0% |
| R8 | 100K | 1.0% |
| R9 | 10K | 1.0% |
| R10 | 23.7K | 1.0% |
| R11 | 21K | 1.0% |
| R12 | 16.8K | 1.0% |
| R13 | 13K | 1.0% |
| R14 | 10.5K | 1.0% |
| R15 | 475K | 1.0% |
| R16 | 9.09K | 1.0% |
| R17 | 8.66K | 1.0% |
| R18 | 7.68K | 1.0% |
| R19 | 5.76K | 1.0% |
| LED21 | | |
| LED22 | | |
| D1 | 1 N 4148 | |
| C1 | 1 mfd 25 v | 5% |
| C2 | 0.1 mff 125 v | 5% |
| C3 | 0.1 mfd 125 v | 5% |

The foregoing embodiment constitutes the best mode known by the inventors of carrying out this invention. The embodiment is, however, only representative of the invention and this invention is not to be considered as limited thereto. One of ordinary skill in the art could make other embodiments while not departing from the spirit and scope of the invention which is defined by the following claims.

What is claimed is:

1. An automatic water quality indicating system comprising:

sensor means for introduction into a body of water to be measured for total dissolved solids content;

said sensor means being responsive to the electrical resistivity of the water in the region of said sensor;

resistance means for comparison with the water electrical resistivity;

differential sensing means for determining the greater electrical resistance in said water or said resistance means;

voltage responsive indicator means for indicating the greater electrical resistance as determined by said differential sensing means;

a pulse power supply for supplying pulses of power to said sensor means, said resistance means, said differential sensing means and said voltage responsive indicator means;

battery voltage supply means for continuously supplying operating power to said pulse power supply;

whereby the resistivity of the water in the region of said sensor is determined and indicated responsive to pulses of power from said pulse power supply.

2. An automatic water quality indicating system in accordance with claim 1 including gate means coupling said pulse power supply and said differential sensing means to said indicator means;

said gate means operative to supply pulse power to said indicator means.

3. An automatic water quality indicating system in accordance with claim 2 wherein said indicator means comprises at least one voltage responsive light emitting diode and wherein said light emitting diode is powered by said pulse power supply through said gate means.

4. An automatic water quality indicating system in accordance with claim 2 wherein said indicator means comprises at least two light emitting diodes and said gate means comprises a pair of gates, each of said gates coupling a respective one of said light emitting diodes to a respective one of said sensor means of said resistance means whereby one of said light emitting diodes is powered when the resistivity of the water in the region of said sensor means is less than a preselected value and the other of said light emitting diodes is powered when the resistivity of the water in the region of said sensor means is greater than a preselected value.

5. An automatic water quality indicating system in accordance with claim 4 including means for preselecting the value of resistivity of said resistance means wherein said preselecting means includes a plurality of resistances of different value and means for selectively connecting one of said said resistances as said resistance means.

6. An automatic water quality indicating system in accordance with claim 4 wherein said differential sensing means comprises a pair of differential amplifiers, one for each of said light emitting diodes.

7. An automatic water quality indicating system in accordance with claim 1 wherein said differential sensing means comprises a differential amplifier.

8. An automatic water quality indicating system in accordance with claim 1 wherein said battery voltage supply means is directly coupled to said system for continuous powering thereof.

* * * * *